US011941741B2

(12) United States Patent
Wang et al.

(10) Patent No.: US 11,941,741 B2
(45) Date of Patent: *Mar. 26, 2024

(54) HYBRID RENDERING MECHANISM OF A GRAPHICS PIPELINE AND AN EFFECT ENGINE

(71) Applicant: MediaTek Inc., Hsinchu (TW)

(72) Inventors: Chien-Chih Wang, Hsinchu (TW); Ying-Chieh Chen, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/708,965

(22) Filed: Mar. 30, 2022

(65) Prior Publication Data

US 2022/0222885 A1    Jul. 14, 2022

Related U.S. Application Data

(63) Continuation of application No. 16/789,870, filed on Feb. 13, 2020, now Pat. No. 11,321,901.

(51) Int. Cl.
*G06T 15/00* (2011.01)
*G06T 1/20* (2006.01)
*G06T 1/60* (2006.01)
*G06T 15/06* (2011.01)

(52) U.S. Cl.
CPC ............. *G06T 15/005* (2013.01); *G06T 1/20* (2013.01); *G06T 15/06* (2013.01); *G06T 1/60* (2013.01)

(58) Field of Classification Search
CPC ......... G06T 15/005; G06T 1/20; G06T 15/06; G06T 1/60; G06T 2200/28
See application file for complete search history.

(56) References Cited

U.S. PATENT DOCUMENTS

| | | | |
|---|---|---|---|
| 2016/0027203 A1* | 1/2016 | Lee | G06T 15/06 345/423 |
| 2020/0050451 A1* | 2/2020 | Babich | G06T 1/20 |
| 2020/0342656 A1* | 10/2020 | Cichocki | G06T 15/20 |

* cited by examiner

*Primary Examiner* — Said Broome
*Assistant Examiner* — Andrew Shin
(74) *Attorney, Agent, or Firm* — Tong J. Lee

(57) ABSTRACT

A graphics system includes an effect engine and a graphics pipeline. The graphics pipeline performs pipeline operations on graphical objects in a frame. The graphics pipeline includes at least a fragment shader stage. An application programming interface (API) provides an instruction that specifies a subset of the graphical objects in the frame for the effect engine to execute. When detecting the instruction, the graphics pipeline invokes the effect engine to perform a predefined set of graphics operations on the subset of the graphical objects in the frame. The predefined set of graphics operations has a higher computational complexity than the pipeline operations.

20 Claims, 5 Drawing Sheets

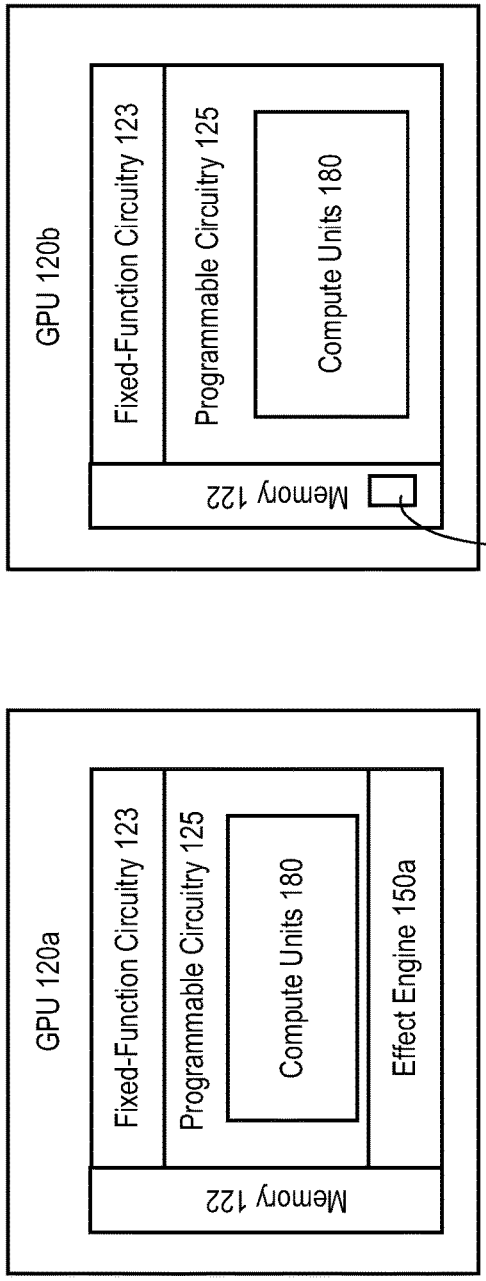
FIG. 1A
FIG. 1B
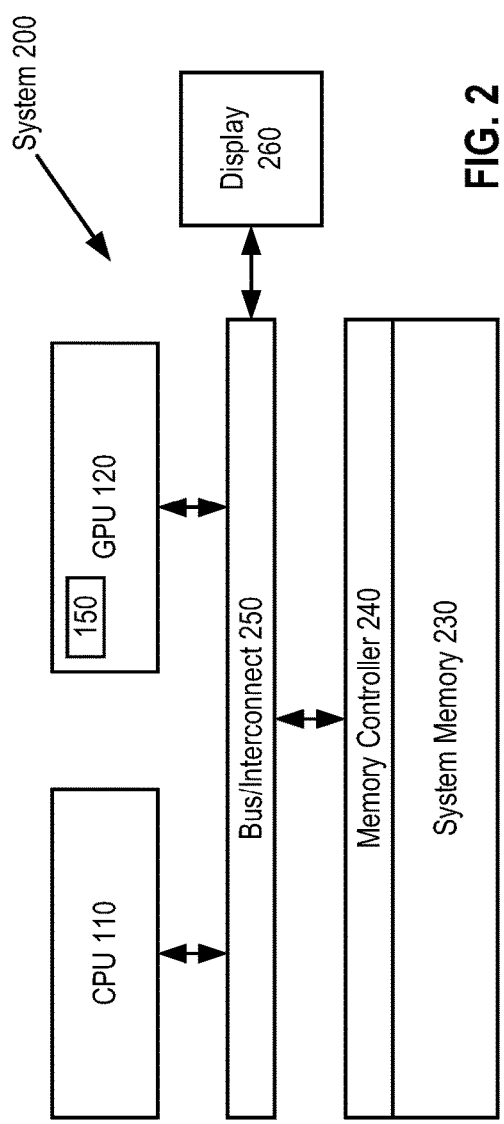
FIG. 2

HYBRID RENDERING MECHANISM OF A GRAPHICS PIPELINE AND AN EFFECT ENGINE

CROSS REFERENCE TO RELATED APPLICATION

This application is a continuation application of U.S. patent application Ser. No. 16/789,870 filed on Feb. 13, 2020, the entirety of which is incorporated by reference herein.

TECHNICAL FIELD

Embodiments of the invention relate to a graphics processing system; and more specifically, to the acceleration of graphics processing.

BACKGROUND

In computer graphics, rendering is the process of producing images on a display device from descriptions of graphical objects or models. A graphics processing unit (GPU) renders 3D graphical objects, which is often represented by a combination of primitives such as points, lines, polygons, and higher-order surfaces, into picture elements (pixels).

A GPU typically includes a graphics pipeline to perform rendering operations. A graphics pipeline includes the following main stages: (1) vertex processing, which processes and transforms the vertices (which describe the primitives) into a projection space, (2) rasterization, which converts each primitive into a set of 3D pixels aligned with the pixel grid on the display device with attributes such as 3D position, color, normal and texture, (3) fragment processing, which processes each individual set of 3D pixels, and (4) output processing, which combines the 3D pixels of all primitives into the 2D space for display.

To render photorealistic effects in images, some people resort to those GPUs that support ray tracing. Ray tracing is a computation-intensive technique that may take days, even weeks, to render complex special effects. Thus, ray tracing is typically used for high quality, non-real time graphics rendering tasks, such as production of animated movies, or producing 2-D images that model behavior of light in different materials. Ray tracing is capable of producing a high degree of visual realism, but at a greater computational cost than the rasterization method. There is a need for incorporating ray tracing into real-time graphics processing to improve the visual quality of rendered images at a reasonable cost.

SUMMARY

In one embodiment, a graphics system comprises an effect engine and a graphics pipeline. The graphics pipeline performs pipeline operations on graphical objects in a frame. The graphics pipeline includes at least a fragment shader stage. An application programming interface (API) provides an instruction that specifies a subset of the graphical objects in the frame for the effect engine to execute. When detecting the instruction, the graphics pipeline invokes the effect engine to perform a predefined set of graphics operations on the subset of the graphical objects in the frame. The predefined set of graphics operations has a higher computational complexity than the pipeline operations.

In another embodiment, a graphics system comprises an effect engine and a graphics pipeline. The graphics pipeline performs pipeline operations on graphical objects in a frame. The graphics pipeline includes at least a first stage and a second stage. An API provides an instruction that specifies a subset of the graphical objects in the frame for the effect engine to execute. When detecting the instruction, the first stage invokes the effect engine to perform a predefined set of graphics operations on the subset of the graphical objects in the frame. The second stage, which is subsequent to the first stage in the graphics pipeline, is operative to receive output of the effect engine and to perform output processing on the graphical objects including the output of the effect engine. The predefined set of graphics operations has a higher computational complexity than the pipeline operations.

In yet another embodiment, a method performed by a graphical processing unit (GPU) is provided. The method comprises performing pipeline operations by a graphics pipeline on graphical objects in a frame. The graphics pipeline includes at least a fragment shader stage. The method further comprises: invoking, by the graphics pipeline, an effect engine in response to an instruction provided by an API, wherein the instruction specifies a subset of the graphical objects in the frame for an effect engine to execute; executing, by the effect engine, a predefined set of graphics operations on the subset of the graphical objects in the frame and generating an output; and performing output processing on the graphical objects including the output of the effect engine for display. The predefined set of graphics operations has a higher computational complexity than the pipeline operations.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 1A illustrates a GPU including an effect engine according to one embodiment.

FIG. 1B illustrates a GPU including an effect engine according to another embodiment.

FIG. 2 illustrates a graphics system including the GPU of FIG. 1A or FIG. 1B according to one embodiment.

DETAILED DESCRIPTION

Figure 3:
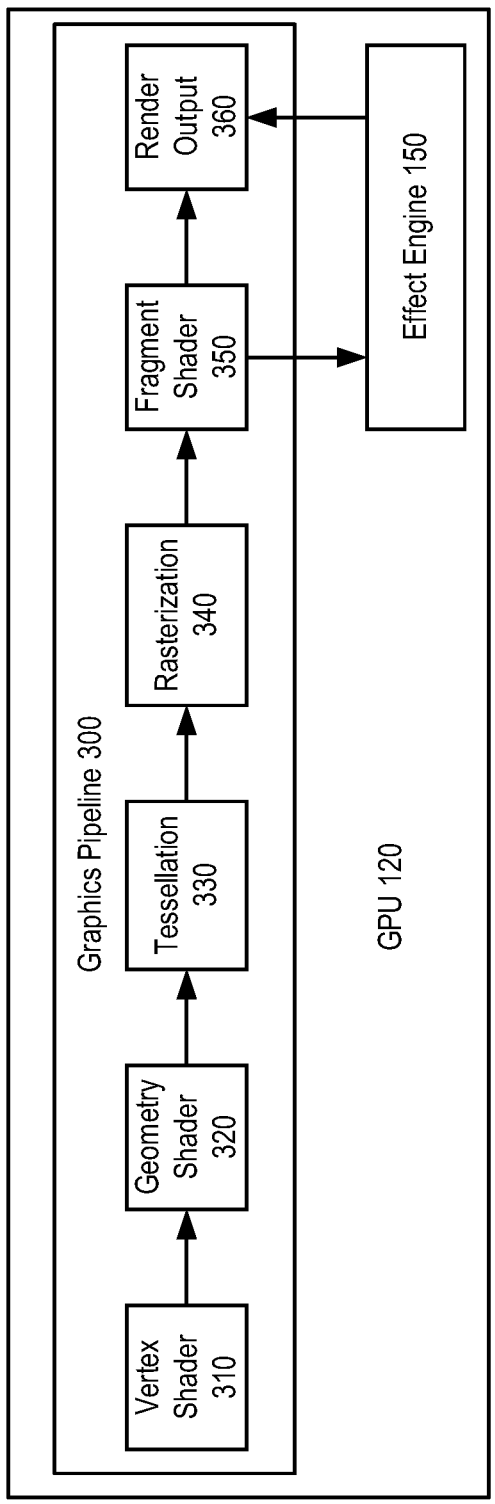
FIG. 3 illustrates a graphics pipeline coupled to an effect engine according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention enable a graphics system to selectively utilize an effect engine to accelerate high complexity graphics operations. The graphics system includes a graphics processing unit (GPU). The GPU may render a frame by executing instructions in two parallel execution paths: one is a graphics pipeline path and the other is an effect engine path. The graphics pipeline, also referred to as the rendering pipeline, performs rasterization operations and outputs pixels in multiple predefined stages. The effect engine is an accelerator in the GPU for performing high complexity graphics operations. The effect engine may perform operations in parallel with the graphics pipeline's operations on graphical objects in the same frame.

An example of high complexity graphics operations performed by the effect engine is ray tracing. A GPU may apply ray tracing to any number of pixels, primitives, objects, and/or effects to be rendered in a frame. It is understood that the techniques described herein are applicable to other high complexity graphics operations. Although ray tracing is used as an example throughout the disclosure, it is understood that the systems and methods of this disclosure are applicable to other high complexity graphics operations that are computationally intensive. In some embodiments, the effect engine may be specialized for performing high complexity graphics operations different from ray tracing. For example, the effect engine may perform high complexity post-processing operations after the fragment shader stage of a graphics pipeline in a GPU. Examples of the post-processing operations include, but are not limited to: ray tracing operations, super-resolution operations, anti-aliasing operations, high dynamic range (HDR) color space conversion (which converts HDR images from one color space colors to another), and tone mapping operations (which map one set of colors to another).

In one embodiment, an application programming interface (API) may include a set of instructions that specify the effect engine path. The instructions may specify one or more of the following for the effect engine to execute: vertices, pixel positions, primitives, graphical objects, effect types, etc. Examples of effect types include, but are not limited to: reflection, refraction, shadow, etc.

In one embodiment, the effect engine may be implemented by hardware. In another embodiment, the effect engine may be implemented by software executed by programmable circuitry in the GPU. In yet another embodiment, the effect engine may be a combination of hardware and software. A hardware effect engine and a software effect engine are shown below with reference to FIG. 1A and FIG. 1B, respectively.

FIG. 1A is a block diagram illustrating a GPU 120*a* according to one embodiment. The GPU 120*a* includes fixed-function circuitry 123 and programmable circuitry 125. An example of programmable circuitry 125 includes an array of compute units 180, which further include an array of arithmetic logic units (ALUs) operable to perform operations in parallel and support execution according to a single instruction multiple data (SIMD) execution model. The programmable circuitry 125 may include additional programmable processing elements that execute instructions. The GPU 120*a* further includes a memory 122 which may store code and data, and may be used as one or more buffers. The memory 122 may include random access memory (RAM) devices, read-only memory (ROM) devices, or other types of memory devices. In one embodiment, the GPU 120*a* includes an effect engine 150*a*, which is a hardware component specialized for target computations (e.g., ray tracing or other high complexity computation tasks). The effect engine 150*a* may be implemented by an application-specific integrated circuit (ASIC), a field-programmable gate array (FPGA), or another type of circuitry.

FIG. 1B is a block diagram illustrating a GPU 120*b* according to another embodiment. In this embodiment, the GPU 120*b* includes an effect engine 150*b* implemented by software code. The software code implementing the effect engine 150*b* may be stored in the memory 122 internal to the GPU 120*b*, and may be executed by the programmable circuitry 125 such as the compute units 180. The effect engine 150*b* may perform the same functions as the effect engine 150*a* in FIG. 1A.

FIG. 2 illustrates a graphics system 200 including a central processing unit (CPU) 110 and a GPU 120 according to one embodiment. Although only one CPU and one GPU is shown, it is understood that the graphics system 200 may include any number of CPUs and GPUs, as well as any number of other processors. In one embodiment, the graphics system 200 may be implemented as a system-on-a-chip (SoC) that is used in a computing and/or communication system. In one embodiment, the CPU 110 and the GPU 120 communicate with a system memory 230 (e.g., dynamic random-access memory (DRAM) or other volatile or non-volatile random-access memory) via a bus or interconnect 240 and a memory controller 250. The graphics system 200 further includes a display 260 that displays rendered images including the output of the GPU 120. It is understood that many other system components are omitted herein for simplicity of illustration.

The GPU 120 may include an effect engine 150 for accelerated computations. An example of the effect engine 150 includes the hardware effect engine 150*a* in FIG. 1A, the software effect engine 150*b* in FIG. 1B, or a combination thereof.

In one embodiment, the CPU 110 or other processing units in the graphics system 200 may send instructions to the GPU 120 for execution. The instructions may instruct the GPU 120 to perform multiple different types of pipeline operations, such as vertex shader, geometry shader, tessellation, rasterization, fragment shader, render output operations (e.g., blending, depth testing, etc.). These pipeline operations are executed by the GPU's graphics pipeline; some of the operations may be executed by the fixed-function circuitry 123 and some others may be executed by the programmable circuitry 125 (FIG. 1A or 1B). A subset of the instructions from the CPU 110 or the other processing units may instruct the GPU 120 to perform predefined high complexity operations, such as ray tracing. In one embodiment, the GPU 120 may dispatch these predefined high complexity operations to the effect engine 150. The effect engine 150 is coupled to but is outside the graphics pipeline.

The following disclosure describes the functionality of the effect engine 150 in relation to the functionality of the graphics pipeline. It is understood that the description is applicable to various forms of implementations of the effect engine 150, including hardware, software, or a combination thereof.

FIG. 3 illustrates functional blocks in the GPU 120 according to one embodiment. Each functional block may be implemented by hardware, software, or a combination thereof. It is understood that in alternative embodiments, the GPU 120 may include fewer, additional, and/or different functional blocks from what is shown in FIG. 3. In this embodiment, the GPU 120 includes a graphics pipeline 300, which further includes the stages of: vertex shader 310, geometry shader 320, tessellation 330, rasterization 340, fragment shader 350, rendering output 360. One or more of the stages, such as the geometry shader 320 and the tessellation 330, may be optional in alternative embodiments. The vertex shader 310, the geometry shader 320 and the tessellation 330 may be collectively referred to as the vertex processing stage.

In the vertex processing stage, the vertex shader 310 receives graphical data such as an ordered list of vertices defining the boundaries of primitives, and transforms these input vertices into output vertices in a projection space. Each output vertex belongs to a primitive, and each primitive is composed of one or more vertices. Primitives are a set of the simplest geometric objects that a graphical system can draw and store; e.g., points, line segments, curves, triangles, polygons, etc. A data structure may be used to describe a vertex, where the data structure includes a set of attributes (e.g., position, color, normal, texture, etc.). The geometry shader 320 processes each primitive and creates geometry according to user-defined instructions as output. The tessellation 330 is a process that divides a surface of a graphical object into a mesh of primitives such as triangles. The rasterization 340 processes and interpolates each set of vertices to generate pixels within each primitive defined by the vertices. These pixels are aligned with the pixel grid of the display. These pixels have the same attributes as their vertices, such as position, color, normal, texture, etc. The output of the rasterization 340 is sent to the fragment shader 350, which performs texture and lighting operations on each primitive. The render output stage 360 performs further processing, e.g., depth test, color blending, etc., before the resulting pixels are sent to a frame buffer for display.

In one embodiment, one of the graphics pipeline stages 310-350 may detect an indication (e.g., an instruction) to invoke the effect engine 150. The instruction may specify one or more pixels, primitives, graphical objects, and/or effects. Upon detecting the instruction, the GPU 120 process branches out from the graphics pipeline 300 to enter the effect engine 150. In the example of FIG. 3, an instruction may direct the fragment shader 350 to send a set of primitives (which represent a portion of a graphical object to be rendered) to the effect engine 150 for ray tracing. The effect engine 150 in this example may be specialized for accelerated ray tracing operations. The output of the effect engine 150, which includes the ray tracing results, may be sent back to the render output stage 360 for further processing, e.g., depth test, color blending, etc. In an alternative embodiment, the output of the effect engine 150 may be written to a color buffer, and may be composited with the output from the graphics pipeline 300 into a frame for display.

Figure 4:
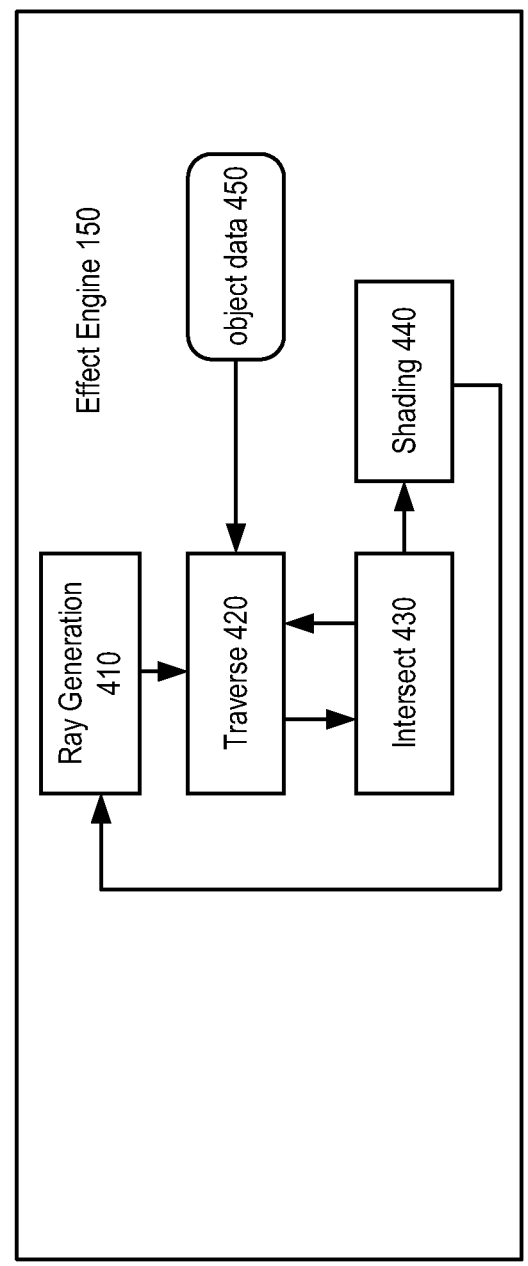
FIG. 4 illustrates an example of an effect engine according to one embodiment.

FIG. 4 is a block diagram illustrating an example of the effect engine 150 performing ray tracing operations according to one embodiment. The effect engine 150 includes a ray generation module 410, a ray traversing module 420, an intersect calculation module 430, and a shading module 440. The ray generation module 410 generates rays for pixels in an image, and provides these rays to the ray traversing module 420. The ray traversing module 420 traverses these rays and tests if a ray intersects any objects in the scene. Ray traversal and intersect calculation uses object data 450 which may include positions, attributes, bounded volume hierarchy (BVH) information, etc. The intersect calculation module 430 identifies the intersected surfaces in a scene, and the calculation may loop over all the objects for each ray. The shading module 440 calculates the effect of each ray intersection. The ray shading calculations may cause additional rays to be created for traversal.

Figure 5A:
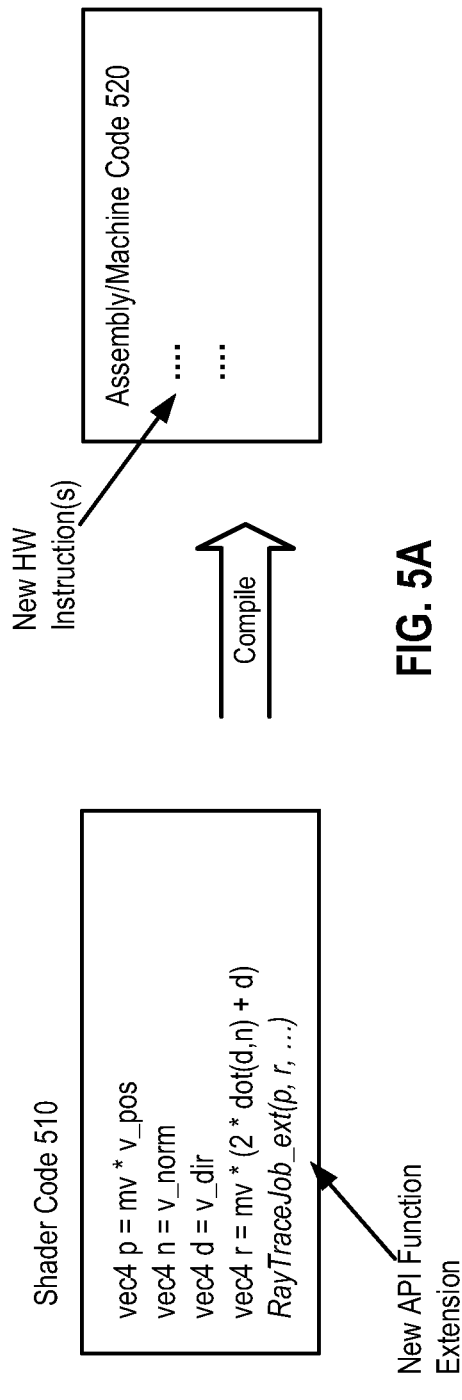
FIGS. 5A and 5B illustrate examples of shader code and corresponding compiled code according to some embodiments.
Figure 5B:
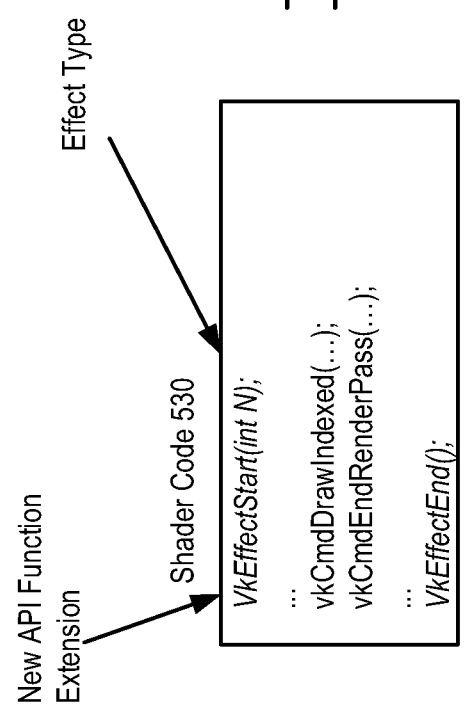

FIG. 5A and FIG. 5B illustrate examples of shader code 510 and 530 and the corresponding compiled code for invoking the effect engine 150 according to some embodiments. The shader code 510 and 530 may be compiled offline or on-the-fly during code execution. The compiled code, such as assembly code or machine code 520 and 540, may be sent from a host processor (e.g., a CPU) to the GPU 120. A predefined set of instructions and/or functions indicate to the GPU 120 which pixels or objects are to be executed by the effect engine 150. In the example of FIG. 5A, the function RayTraceJob_ext is compiled into a new hardware machine instruction in the code 520. In the example of FIG. 5B, the new API function extension VkEffectStart is compiled into a new hardware machine instruction in the code 540. In some embodiments, the shader code 510 and 530 may be written in high-level graphics languages such as OpenGL Shading Language (GLSL), High-Level Shading Language (HLSL) in Direct3D, or C for Graphics (Cg), and the like, with additional GPU API and/or functions defined for the effect engine 150 execution.

Figure 6A:
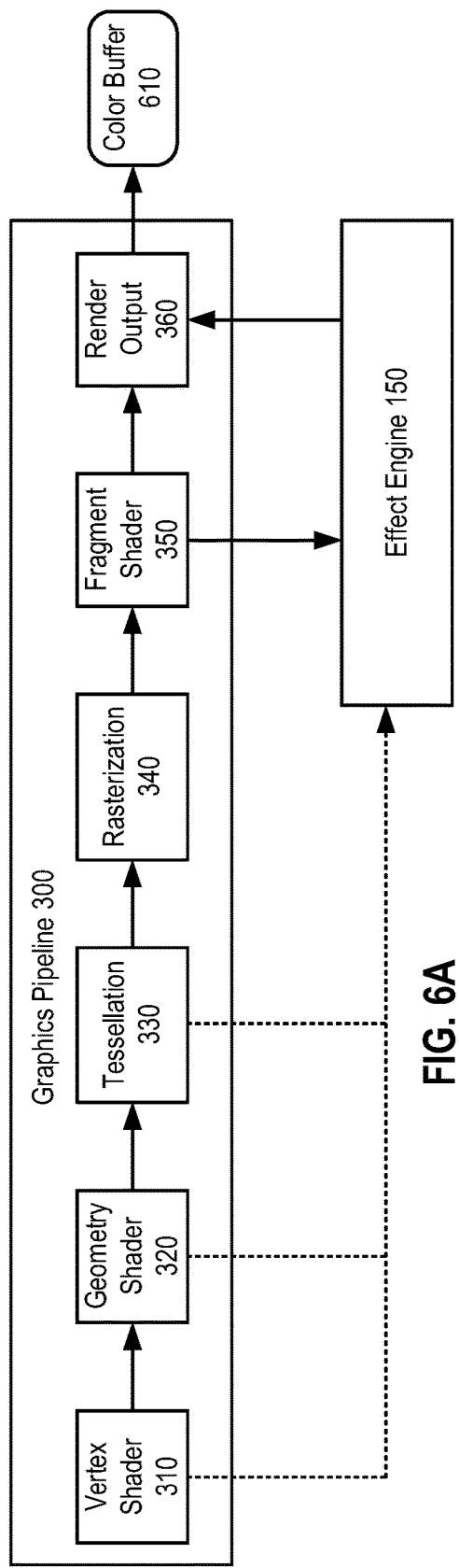
FIGS. 6A and 6B illustrate alternative paths connecting a graphics pipeline to an effect engine according to some embodiments.
Figure 6B:
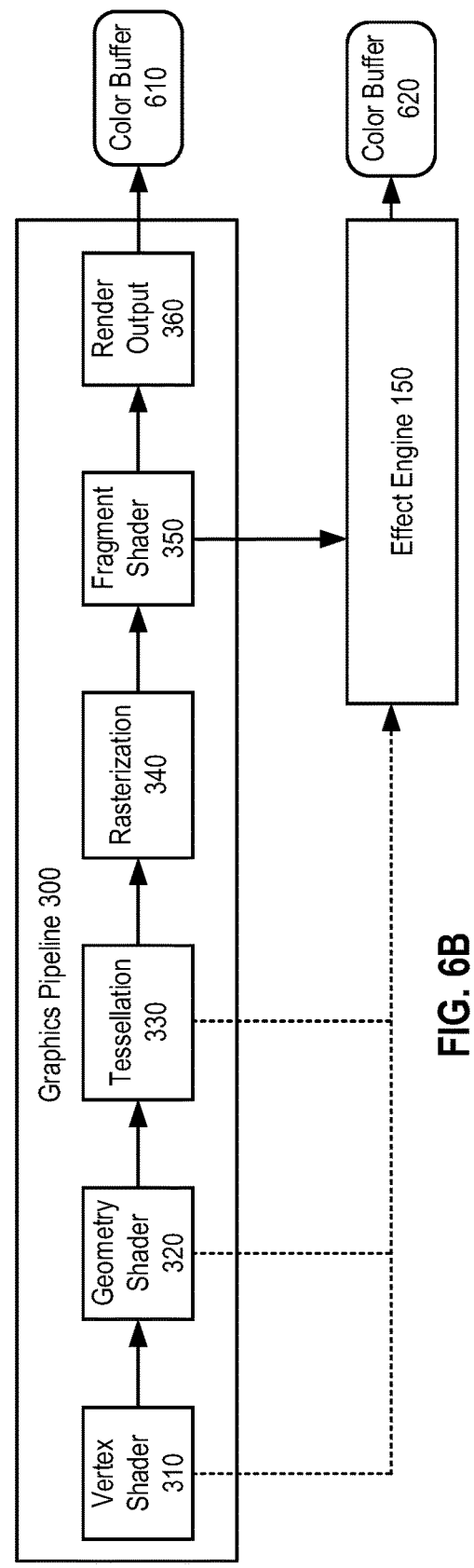

FIGS. 6A and 6B illustrate alternative paths connecting the graphics pipeline 300 to the effect engine 150 according to some embodiments. In FIG. 6A, the output of the effect engine 150 is sent back to the graphics pipeline 300; more specifically, to the render output stage 360 of the graphics pipeline 300, which may perform further processing on the output of the effect engine 150 and the output of the fragment shader 350. The output of the render output stage 360 is written to a color buffer 610, which is read by a display controller and displayed as a frame on a display.

In the alternative embodiment of FIG. 6B, the output of the effect engine 150 is sent to a color buffer 620 which is different from the color buffer 610 coupled to the render output 360. The contents of the color buffers 610 and 620 may be composited into a frame. The composited frame may be read by a display controller and displayed on a display.

FIGS. 6A and 6B illustrate that the fragment shader 350 may invoke the effect engine 150 during the execution of graphics instructions. FIGS. 6A and 6B also illustrate alternative or additional paths for invoking the effect engine 150, as shown in dotted lines. For example, one or more of the vertex shader 310, the geometry shader 320 and the tessellation 330 stages may invoke the effect engine 150. That is, any of the stages 310, 320, 330 and 350 may submit jobs to the effect engine 150 for execution. After the job submission, these stages may continue their pipeline operations without waiting for the effect engine 150 to complete the jobs. Thus, the pipeline operations performed by the graphics pipeline 300 and the effect engine operations may be performed in parallel. These pipeline operations and the effect engine operations may be performed on different pixels, objects and/or effects in the same frame.

According to one embodiment described herein, the graphics pipeline 300 is operative to perform pipeline operations on graphical objects in a frame. The effect engine 150 is operative to execute a predefined set of graphics operations on a subset of the graphical objects in the frame. The predefined set of graphics operations performed by the effect engine 150 has a higher computational complexity than the pipeline operations. One or more buffers (e.g., the color buffers 610 and 620) are operative to receive pixels of the frame for display. The displayed frame includes the graphical objects operated on by the graphics pipeline 300 and the subset of the graphical objects operated on by the effect engine 150.

The color buffers 610 and 620 may be implemented by memory allocated from a memory hierarchy. In some embodiments, portions or all of these color buffers 610 and 620 may be implemented in dedicated memory elements.

Figure 7:
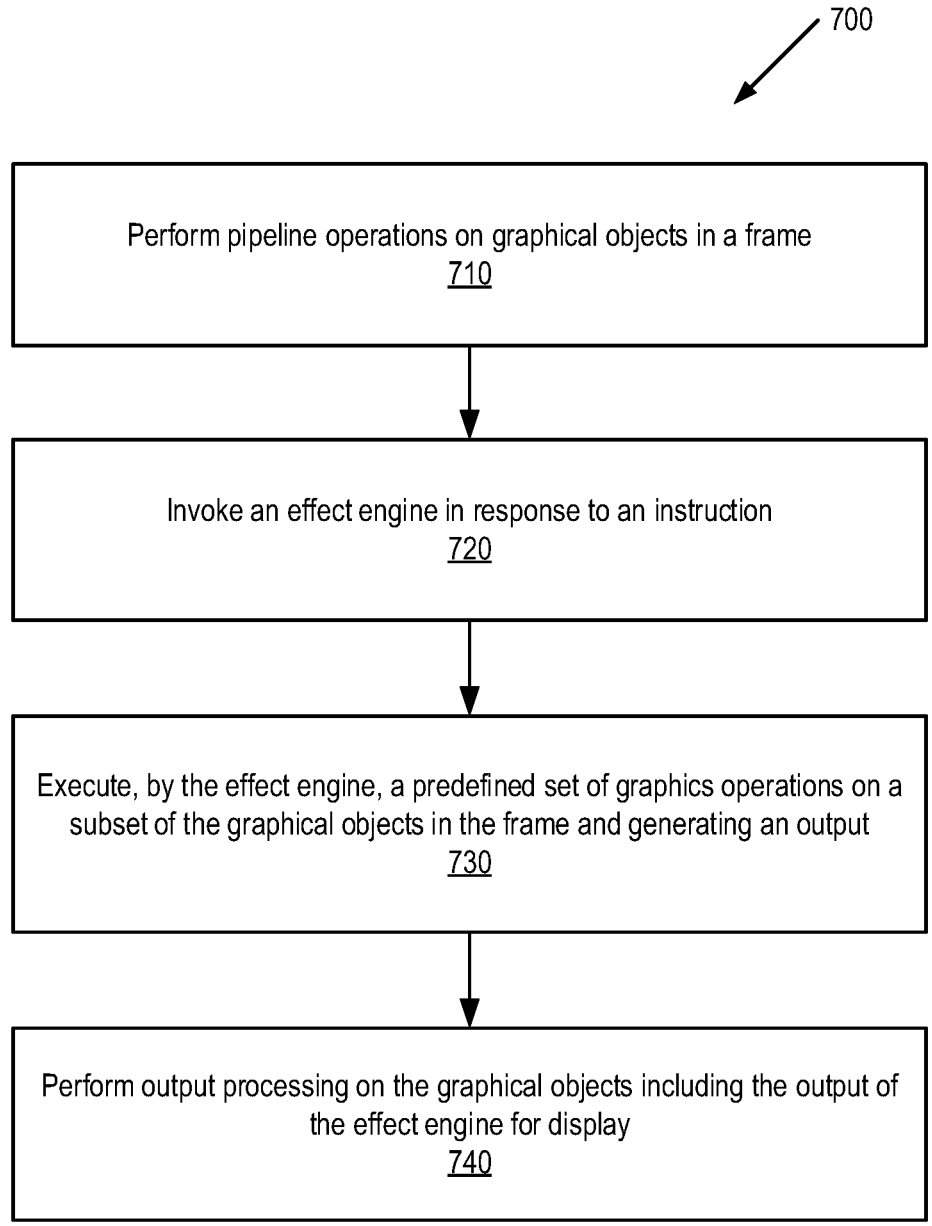
FIG. 7 is a flow diagram illustrating a method performed by a GPU according to one embodiment.

FIG. 7 is a flow diagram illustrating a method 700 of a GPU (e.g., the GPU 120 of FIG. 2) according to one embodiment. In one embodiment, the method 700 begins when the GPU at step 710 performs pipeline operations on graphical objects in a frame. An effect engine (e.g. the effect engine 150 in FIG. 2) is invoked at step 720 in response to an instruction. The effect engine at step 730 executes a predefined set of graphics operations on a subset of the graphical objects in the frame and generating an output. The GPU at step 740 performs output processing on the graphical objects including the output of the effect engine for display. The predefined set of graphics operations has a higher computational complexity than the pipeline operations.

The method 700 may be performed by hardware (e.g., circuitry, dedicated logic, programmable logic, microcode, etc.), software (e.g., instructions run on a processing device), or a combination thereof. In one embodiment, the GPU 120 may be part of a mobile computing and/or communication device (e.g., a smartphone, a tablet, laptop, etc.). In one embodiment, the GPU 120 may be part of a server system or a cloud computing system.

The operations of the flow diagram of FIG. 7 have been described with reference to the exemplary embodiments of FIGS. 1A, 1B, 2, 6A and 6B. However, it should be understood that the operations of the flow diagram of FIG. 7 can be performed by embodiments of the invention other than those discussed with reference to FIGS. 1A, 1B, 2, 6A and 6B, and the embodiments discussed with reference to FIGS. 1A, 1B, 2, 6A and 6B can perform operations different than those discussed with reference to the flow diagrams. While the flow diagram of FIG. 7 shows a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A graphics system comprising:
an effect engine; and
a graphics pipeline operative to perform pipeline operations on graphical objects in a frame, the graphics pipeline including at least a fragment shader stage,
wherein an application programming interface (API) provides instructions that direct a plurality of stages of the graphics pipeline before and after rasterization to invoke the effect engine,
wherein the API further provides an instruction that directs a given stage of the graphics pipeline to send a subset of the graphical objects in the frame to the effect engine to execute,
wherein the given stage of the graphics pipeline, when detecting the instruction provided by the API, invokes the effect engine to perform a predefined set of graphics operations on the subset of the graphical objects in the frame, and
wherein the predefined set of graphics operations has a higher computational complexity than the pipeline operations.

2. The system of claim 1, wherein the graphics pipeline is operative to detect API provided instructions that specify one or more of: vertices, pixel positions, primitives, the subset of the graphical objects in the frame, and effect types for the effect engine to execute.

3. The system of claim 1, wherein the effect engine is invoked to execute the predefined set of graphics operations by one or more stages in the graphics pipeline, the stages including a vertex shader stage, a tessellation stage, a geometry shader stage and the fragment shader stage.

4. The system of claim 1, wherein the effect engine is invoked to execute the predefined set of graphics operations by the fragment shader stage of the graphics pipeline.

5. The system of claim 1, wherein the predefined set of graphics operations include ray tracing operations.

6. The system of claim 1, wherein output of the effect engine is sent to the graphics pipeline for render output processing.

7. The system of claim 1, wherein output of the graphics pipeline is sent to a first buffer and output of the effect engine is sent to a second buffer, and wherein the system is operative to composite contents of the first buffer and the second buffer for display.

8. The system of claim 1, wherein the graphics pipeline is operative to perform at least a portion of the pipeline operations concurrently with the effect engine executing the predefined set of graphics operations.

9. A graphics system comprising:
an effect engine; and
a graphics pipeline operative to perform pipeline operations on graphical objects in a frame, the graphics pipeline including at least a fragment shader,
wherein an application programming interface (API) provides instructions that direct a plurality of stages of the graphics pipeline before and after rasterization to invoke the effect engine,
wherein the API further provides an instruction that directs a first stale of the plurality of stapes to send a subset of the graphical objects in the frame to the effect engine to execute,
wherein the first stage, when detecting the instruction provided by the API, invokes the effect engine to perform a predefined set of graphics operations on the subset of the graphical objects in the frame, and
wherein a second stale of the plurality of stapes, which is subsequent to the first stage in the graphics pipeline, is operative to receive output of the effect engine and to perform output processing on the graphical objects including the output of the effect engine, and wherein the predefined set of graphics operations has a higher computational complexity than the pipeline operations.

10. The system of claim 9, wherein the first stage is one of pipeline stages including a vertex shader stage, a tessellation stage, a geometry shader stage and a fragment shader stage.

11. The system of claim 9, wherein the predefined set of graphics operations include ray tracing operations.

12. The system of claim 9, wherein the graphics pipeline is operative to detect API provided instructions that specify one or more of: vertices, pixel positions, primitives, the subset of the graphical objects in the frame, and effect types for the effect engine to execute.

13. The system of claim 9, wherein output of the graphics pipeline is sent to a first buffer and output of the effect engine is sent to a second buffer, and wherein the system is operative to composite contents of the first buffer and the second buffer for display.

14. The system of claim 9, wherein the graphics pipeline is operative to perform at least a portion of the pipeline operations concurrently with the effect engine executing the predefined set of graphics operations.

15. A method performed by a graphical processing unit (GPU), comprising:
performing, by a graphics pipeline, pipeline operations on graphical objects in a frame, wherein the graphics pipeline includes at least a fragment shader stage;
receiving instructions provided by an application programming interface (API), the instructions to direct a plurality of stages of the graphics pipeline before and after rasterization to invoke an effect engine, wherein receiving the instructions further comprises:
invoking, by a given stage of the graphics pipeline, the effect engine in response to an instruction provided by the API, wherein the instruction directs the given stage to send a subset of the graphical objects in the frame to the effect engine to execute;
executing, by the effect engine, a predefined set of graphics operations on the subset of the graphical objects in the frame and generating an output; and
performing output processing on the graphical objects including the output of the effect engine for display,
wherein the predefined set of graphics operations has a higher computational complexity than the pipeline operations.

16. The method of claim 15, wherein the effect engine is invoked by one or more stages in the graphics pipeline, the stages including a vertex shader stage, a tessellation stage, a geometry shader stage and the fragment shader stage.

17. The method of claim 15, wherein the predefined set of graphics operations include one or more of post-processing operations performed after the fragment shader stage of the graphics pipeline, the post-processing operations including: ray tracing operations, super-resolution operations, anti-aliasing operations, high dynamic range (HDR) color space conversion and tone mapping operations.

18. The method of claim 15, wherein output of the effect engine is sent to the graphics pipeline for render output processing.

19. The method of claim 15, wherein output of the graphics pipeline is sent to a first buffer and output of the effect engine is sent to a second buffer, and wherein the system is operative to composite contents of the first buffer and the second buffer for display.

20. The method of claim 15, wherein the graphics pipeline is operative to perform at least a portion of the pipeline operations concurrently with the effect engine executing the predefined set of graphics operations.

\* \* \* \* \*